United States Patent
Xu

(10) Patent No.: US 12,287,920 B2
(45) Date of Patent: Apr. 29, 2025

(54) VIBRATION SIGNAL TESTING METHOD, VIBRATION SIGNAL TESTING DEVICE, STORAGE MEDIUM, ELECTRONIC DEVICE

(71) Applicant: AAC Acoustic Technologies (Shanghai) Co., Ltd., Shanghai (CN)

(72) Inventor: Jin Xu, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 44 days.

(21) Appl. No.: 18/338,371

(22) Filed: Jun. 21, 2023

(65) Prior Publication Data

US 2024/0143082 A1    May 2, 2024

Related U.S. Application Data

(63) Continuation of application No. PCT/CN2022/135237, filed on Nov. 30, 2022.

(30) Foreign Application Priority Data

Oct. 28, 2022    (CN) .......................... 202211338748.3

(51) Int. Cl.
| | |
|---|---|
| *G06F 3/01* | (2006.01) |
| *G08B 6/00* | (2006.01) |
| *H04M 1/24* | (2006.01) |
| *H04M 1/72454* | (2021.01) |

(52) U.S. Cl.
CPC .............. *G06F 3/016* (2013.01); *G08B 6/00* (2013.01); *H04M 1/24* (2013.01); *H04M 1/72454* (2021.01)

(58) Field of Classification Search
CPC ...... G06F 3/016; G08B 6/00; H04M 1/72454; H04M 1/24
See application file for complete search history.

(56) References Cited

U.S. PATENT DOCUMENTS

| | | | |
|---|---|---|---|
| 9,217,662 B2* | 12/2015 | Saloio, Jr. .............. | G01H 1/006 |
| 10,319,199 B2* | 6/2019 | Obana ................... | A63F 13/285 |
| 10,972,826 B1* | 4/2021 | Tseng ................... | H04R 1/1008 |

FOREIGN PATENT DOCUMENTS

CN      114543976 A   *   5/2022

OTHER PUBLICATIONS

PCT/CN2022/135237 Written Opinion (Year: 2023).*

* cited by examiner

*Primary Examiner* — John A Tweel, Jr.
(74) *Attorney, Agent, or Firm* — Wiersch Law Group

(57) ABSTRACT

A vibration signal testing method, a vibration signal testing device, a storage medium, and an electronic device are provided. The vibration signal testing method includes: collecting an editing operation of a user, obtaining a first vibration signal according to the editing operation, outputting the first vibration signal to a mobile terminal. The vibration signal testing method further includes determining corresponding test result according to actual vibration effect of the first vibration. By directly using a mobile terminal with vibration function as the output source of vibration signals, the user can experience the actual vibration effect of the designed vibration signal more quickly and conveniently. By combining professional design and production on the desktop with convenient experience on the mobile terminal, vibration signals can flow in both directions, thereby improving the testing efficiency, design efficiency, and design accuracy of vibration signals.

12 Claims, 2 Drawing Sheets

101 Collect an editing operation of a user

102 Obtain a first vibration signal according to the editing operation

103 Output the first vibration signal to a mobile terminal

104 Determine corresponding test result according to actual vibration effect of the first vibration

FIG. 1

201 Collecting module

202 Processing module

203 Communicating module

FIG. 2

VIBRATION SIGNAL TESTING METHOD, VIBRATION SIGNAL TESTING DEVICE, STORAGE MEDIUM, ELECTRONIC DEVICE

CROSS REFERENCE TO RELATED APPLICATIONS

The present application is a continuation of PCT Patent Application No. PCT/CN2022/135237, entitled "VIBRATION SIGNAL TESTING METHOD, VIBRATION SIGNAL TESTING DEVICE, STORAGE MEDIUM, AND ELECTRONIC DEVICE," filed Sep. 9, 2022, which claims priority to Chinese patent application No. 202211338748.3, entitled "VIBRATION SIGNAL TESTING METHOD, VIBRATION SIGNAL TESTING DEVICE, STORAGE MEDIUM, AND ELECTRONIC DEVICE," filed Oct. 28, 2022, each of which is incorporated by reference herein in its entirety, which is incorporated herein by reference in its entirety.

TECHNICAL FIELD

The present disclosure relates to the technical filed of vibration signals, in particular to a vibration signal testing method, a vibration signal testing device, a storage medium, and an electronic device.

BACKGROUND

The vibration of intelligent terminals is one of the ways to enhance the user experience. For example, the vibration of a mobile phone can remind a user to view information. The vibration of a gamepad can bring the user a more immersive gaming experience, etc. The vibration effect of intelligent terminals depends on the design of vibration signals. In response to parameters such as vibration type, frequency, and intensity being designed by a designer, corresponding vibration signals are generated. A motor driver program of the intelligent terminal controls a motor to execute the corresponding vibration based on the vibration signals. In response to designing vibration signals, a small number of simple vibration signals can be designed through corresponding application programs on mobile terminals, but complex vibration signal design cannot be completed. Although complex vibration signal designs can be completed through corresponding applications on the desktop, the testing efficiency for actual vibration effects is relatively low.

SUMMARY

In view of this, a vibration signal testing method, a vibration signal testing device, a storage medium, and an electronic device are provided according to the embodiments of the present disclosure, to improve the testing efficiency of vibration signals.

According to a first aspect of the embodiments of the present disclosure, a vibration signal testing method is provided, which includes:
  collecting an editing operation of a user;
  obtaining a first vibration signal according to the editing operation;
  outputting the first vibration signal to a mobile terminal, where the first vibration signal is used to instruct the mobile terminal to execute a first vibration;
  determining corresponding test result according to actual vibration effect of the first vibration.

As an improvement, the editing operation includes at least one or a combination of following operations:
  editing trigger time of at least one set of preset basic vibration signals, editing trigger frequency of the at least one set of preset basic vibration signals, and editing signal superposition of the at least one set of preset basic vibration signals.

As an improvement, the method further includes:
  adjusting the first vibration signal after preset triggering conditions are detected by the mobile terminal, and adjusting vibration effect of the first vibration, where adjusting the vibration effect of the first vibration includes: adjusting vibration frequency and/or vibration intensity.

As an improvement, the method further includes:
  obtaining an adjusted first vibration signal from the mobile terminal, where the adjusted first vibration signal includes at least one or a combination of a trigger time point, a vibration type, the vibration frequency, and the vibration intensity;
  saving the adjusted first vibration signal accordingly.

As an improvement, the mobile terminal is provided with a control component and a vibration component, the vibration component is configured to execute vibration for the mobile terminal, and the control component is configured to control operating status of the vibration component by sending control instructions to the vibration component; where obtaining the adjusted first vibration signal from the mobile terminal includes:
  collecting control instructions sent by the control component;
  determining the adjusted first vibration signal according to the control instructions.

As an improvement, the vibration component is a vibration motor, and the adjusted first vibration signal further includes a resonant frequency of the vibration motor.

As an improvement, the method further includes:
  in response to the mobile terminal performing mixed vibration, obtaining at least two corresponding preset vibration signals from the mobile terminal, where the mobile terminal is provided with a plurality of preset buttons, and each of the plurality of preset buttons corresponds to a preset vibration signal; in response to at least two preset buttons being triggered, performing, by the mobile terminal, the mixed vibration;
  saving the at least two preset vibration signals as mixed vibration signals or separately saving the at least two preset vibration signals as independent vibration signals.

According to a second aspect of the embodiments of the present disclosure, a vibration signal testing device is provided, which includes:
  a collecting module configured to collect an editing operation of a user;
  a processing module configured to obtain a first vibration signal according to the editing operation;
  a communicating module configured to output the first vibration signal to a mobile terminal, where the first vibration signal is used to instruct the mobile terminal to execute the first vibration;
  where the processing module is further configured to determine corresponding test result according to actual vibration effect of the first vibration.

According to a third aspect of the embodiments of the present disclosure, a storage medium is provided, which includes a stored program, where a device on which the storage medium is located is controlled to execute the method according to any one above while the program is running.

According to a fourth aspect of the embodiments of the present disclosure, an electronic device is provided, which includes a memory and a processor, where the memory is configured to store information including program instructions, and the processor is configured to control the program instructions to be executed, where the program instructions, when being loaded and executed by the processor, causes the method according to any one above to be executed.

In the technical solution of the vibration signal testing method provided according to the embodiments of the present disclosure, by using a mobile terminal with vibration function as the output source of the vibration signal, the vibration signal designed on the desktop can be directly tested for actual vibration effect on the mobile terminal. During the vibration process of the mobile terminal, the frequency and intensity of the vibration can be adjusted at any time, and the adjusted vibration signal can be obtained and saved for further editing. The vibration signal testing method provided according to the embodiments of the present disclosure can achieve bidirectional transmission of vibration signals between the mobile terminal and the desktop terminal, thereby improving the testing efficiency of vibration signals.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be acquired based on the provided drawings without any creative efforts.

FIG. 1 is a flowchart of a vibration signal testing method provided according to an embodiment of the present disclosure;

FIG. 2 is a schematic structural view of a vibration signal testing device provided according to an embodiment of the present disclosure.

DETAILED DESCRIPTION

Figure 3:
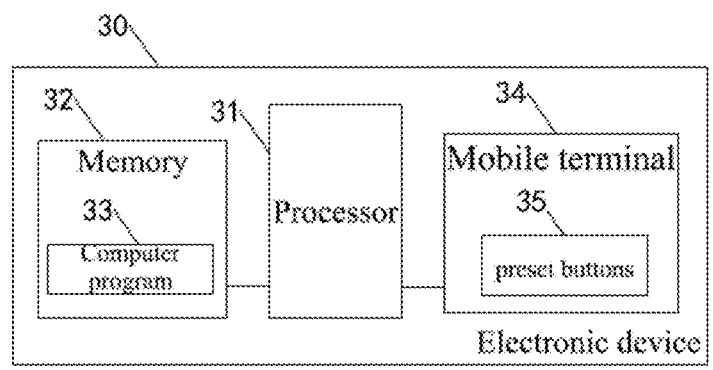
FIG. 3 is a schematic view of an electronic device provided according to an embodiment of the present disclosure.

The present disclosure will be further described below with reference to the accompanying drawings and embodiments.

It should be clarified that the described embodiments are only a part of the embodiments of the present disclosure, not all of them. Based on the embodiments in the present disclosure, all other embodiments obtained by those of ordinary skill in the art without creative labor fall within the scope of protection of the present disclosure.

The terms used in the embodiments of the present disclosure are solely for the purpose of describing specific embodiments, and are not intended to limit the present disclosure. The singular forms of "one", "said", and "the" used in the embodiments of the present disclosure and the accompanying claims are also intended to include the majority form, unless the context clearly indicates otherwise.

It should be understood that the term "and/or" used herein is only a description of the association relationship between related objects, indicating that there can be three types of relationships, such as A and/or B, which can represent the three situations: the existence of A alone, the existence of A and B simultaneously, and the existence of B alone. In addition, the character '/' used herein generally indicates that the associated object is an 'or' relationship.

A vibration signal testing method is provided according to the embodiments of the present disclosure. The method can be applied to a vibration signal testing device. The vibration signal testing device can be specifically implemented as intelligent terminal devices such as a personal computer (PC), a laptop, or a tablet.

FIG. 1 is a flowchart of a vibration signal testing method provided according to an embodiment of the present disclosure. As shown in FIG. 1, the method includes the following operations 101 to 104.

In operation 101, an editing operation of a user is collected. The user can perform specific vibration signal editing on a desktop (i.e., a vibration signal testing device), where multiple sets of preset basic vibration signals are preset. The user can perform secondary editing on the multiple sets of preset vibration signals to obtain the desired vibration effect. Among them, the basic vibration signal refers to the collection of continuous vibration and/or transient vibration signals that comply with HE standard. The HE standard specifically refers to a part of the standard indicators related to tactile feedback in the IEEE2861.3 game standard. The editing operation specifically includes editing trigger time of at least one set of preset basic vibration signals, editing trigger frequency of the at least one set of preset basic vibration signals, and editing signal superposition of the at least one set of preset basic vibration signals.

In operation 102, a first vibration signal is obtained according to the editing operation. The specific parameters of the corresponding first vibration signal can be obtained based on the operation data corresponding to the above editing operations. For example, engineering files corresponding to vibration signal editing using development software on the desktop. Alternatively, the users can click Save after editing, the corresponding vibration signal is directly obtained.

In operation 103, the first vibration signal is outputted to a mobile terminal, where the first vibration signal is used to instruct the mobile terminal to execute a first vibration. The mobile terminal is connected to the desktop through wired or wireless means. The mobile terminal may be a mobile phone, a gamepad, or other terminal devices with vibration function, which are not limited thereto the embodiments of the present disclosure.

In operation 104, corresponding test result is determined according to actual vibration effect of the first vibration. The user can determine whether the desired vibration effect is according to the actual vibration situation of the mobile terminal. In response to the actual vibration effect being satisfied by the user, the test result is determined as passed, and the first vibration signal is recorded in the form of a specific vibration resource and saved.

In some embodiments, real-time adjustments are made in response to the actual vibration effect of the mobile terminal not being satisfied by the user. Specifically, after the preset triggering conditions are detected, the first vibration signal is adjusted by the mobile terminal, thereby adjusting the vibration effect of the first vibration. Optionally, adjusting the vibration effect of the first vibration includes adjusting the vibration frequency and adjusting the vibration intensity.

In some embodiments, the mobile terminal is provided with physical buttons or virtual buttons, and the vibration frequency and the vibration intensity can be adjusted by the user clicking the corresponding buttons. Therefore, in response to the user clicking the corresponding button, the preset triggering conditions are confirmed to be detected by the mobile terminal. In a specific example, in response to the mobile terminal being a gamepad device, the upper, lower, left, and right on a stick of the gamepad device are mapped as increasing the vibration frequency, decreasing the vibration frequency, increasing the vibration intensity, and decreasing the vibration intensity, respectively. Alternatively, the upper, lower, left, and right buttons in direction buttons are mapped as increasing the vibration frequency, decreasing the vibration frequency, increasing the vibration intensity, and decreasing the vibration intensity, respectively.

In another specific example, a mobile terminal is a smart terminal with a touch screen, such as a mobile phone. The user can adjust the vibration frequency and the vibration intensity by performing specific gesture actions on the touch screen. Optionally, a detection hotspot can be set on the touch screen to trigger corresponding gesture monitoring in response to the user performing a long press operation in the detection hotspot. After that, the user can change the vibration frequency and the vibration intensity by sliding up and down, as well as left and right. For example, the user can control the increase or decrease of vibration frequency by long pressing and then sliding up and down in the detection hotspot, while sliding up and down can control the increase or decrease of vibration intensity.

In some embodiments, in order to make more precise adjustments to the vibration frequency and the vibration intensity, adjustments to the vibration frequency and the vibration intensity can be made on the desktop. Optionally, the desktop provides virtual buttons for increasing and decreasing the vibration frequency. Every time a user clicks a virtual button, it will correspondingly increase or decrease the vibration frequency or the vibration intensity of a preset unit value. For example, in response to the user clicking the vibration frequency increase button once and the preset unit value being 10 Hz, the desktop generates a control instruction to increase the vibration frequency by 10 Hz to the mobile terminal. In response to the control instruction being received by the mobile terminal, the preset triggering conditions are determined by the mobile terminal as satisfied, and corresponding operation is executed accordingly.

In some embodiments, after the first vibration signal is adjusted by the user, the adjusted first vibration signal is obtained from the mobile terminal. The adjusted first vibration signal includes at least one or a combination of a trigger time point, a vibration type, the vibration frequency, and the vibration intensity. Among them, the trigger time point refers to the start and end time of the vibration signal and the process control time point. The vibration type refers to the basic vibration signals such as continuous and transient in the HE standard. Afterwards, the adjusted first vibration signal is correspondingly saved for use or further editing.

In some embodiments, the mobile terminal is provided with a control component and a vibration component. The vibration component is configured to execute vibration for the mobile terminal, and the control component is configured to control operating status of the vibration component by sending control instructions to the vibration component. The operation of obtaining the adjusted first vibration signal from the mobile terminal specifically includes collecting control instructions sent by the control component, and determining the adjusted first vibration signal according to the control instructions. The desktop obtains control instructions and converts them through a data interface. Optionally, the control instructions sent by some mobile terminal control components to the vibration components are the vibration signals themselves, and at this point, the vibration signals sent by the control components to the vibration components can be directly obtained. Specifically, the vibration signals sent by the mobile terminal are converted into binary data, which is then transmitted to the desktop through a data interface. The desktop captures and converts the binary data received by the data interface through specialized tool software to obtain the vibration signal sent by the mobile terminal. In response to the above vibration component being a vibration motor, the first vibration signal obtained from the mobile terminal further includes a resonant frequency of the vibration motor.

In some embodiments, the user can not only edit vibration signals through the desktop, but also perform vibration signal editing operations on the mobile terminal 34. Specifically, there are multiple preset buttons 35 on the mobile terminal 34, which can be virtual buttons or mapped physical buttons. Each of the multiple preset buttons 35 corresponds to a preset vibration signal. Taking virtual buttons as an example, multiple preset vibration signals can be displayed on the touch screen by icon buttons of different shapes or colors on the mobile terminal 34. The user can pre assign simple vibration signals to each icon button or reassign their own vibration signals to the icon button. The user can expand the type of vibration signal by changing the arrangement order and number of multiple icon buttons. Afterwards, the user can click the specified button to make the mobile terminal 34 vibrate according to the set parameters. The mobile terminal 34 sends the corresponding vibration signal to the desktop for saving or re editing. For the mobile terminal 34 such as a gamepad that are not provided with a touch screen, mapping relationships can be established between each button on the gamepad and each preset vibration signal. In response to the user triggering the mapped button, the gamepad sends the corresponding vibration signal based on the mapping relationship and performs the corresponding vibration.

Optionally, in response to at least two preset buttons 35 mentioned above being triggered simultaneously, the mobile terminal 35 performs a mixed vibration. In response to the mobile terminal 35 performing the mixed vibration, the desktop obtains at least two preset vibration signals that are triggered from the mobile terminal 35. Afterwards, the desktop can save at least two vibration signals as independent mixed wave signals, or save at least two preset vibration signals as independent vibration signals separately. Optionally, the user can make corresponding settings on the mobile terminal 35. In response to a mixed output mode being set on the mobile terminal 35, the mobile terminal 35 provides a mixed independent vibration signal to the desktop, and the desktop saves it accordingly. In response to an independent output mode being set on the mobile terminal 35, the mobile terminal 35 provides multiple preset vibration signals triggered as independent vibration signals to the desktop. Alternatively, the user can make corresponding settings on the desktop, and the mobile terminal 35 can output multiple preset vibration signals separately. The desktop determines whether to save multiple preset vibration signals as independent vibration signals or mix them before saving based on the settings.

The vibration signal testing method provided according to the embodiments of the present disclosure allows the user to experience the actual vibration effect of the designed vibration signal quickly and conveniently by using a mobile terminal with vibration function as the output source of the desktop vibration signal. By combining professional design and production on the desktop with the convenient experience of the mobile terminal, the signals are allowed to flow in both directions, thereby improving the efficiency and accuracy of vibration effect design.

The embodiment of the present disclosure provides a vibration signal testing device corresponding to the above vibration signal testing method. FIG. 2 is a schematic structural view of a vibration signal testing device provided according to an embodiment of the present disclosure. As shown in FIG. 2, the vibration signal testing device includes: a collecting module 201, a processing module 202, and a communicating module 203.

The collecting module 201 is configured to collect an editing operation of a user.

The processing module 202 is configured to obtain a first vibration signal according to the editing operation.

The communicating module 203 is configured to output the first vibration signal to a mobile terminal, where the first vibration signal is used to instruct the mobile terminal to execute the first vibration.

The processing module 202 is further configured to determine corresponding test result according to actual vibration effect of the first vibration.

A storage medium is provided according to the embodiments of the present disclosure, which includes a stored program, where a device on which the storage medium is located is controlled to execute any operation in the above vibration signal testing method while the program is running. The reference of specific description may be made to the embodiments of the above vibration signal testing method.

An electronic device is provided according to the embodiments of the present disclosure, which includes a memory and a processor, where the memory is configured to store information including program instructions, and the processor is configured to control the program instructions to be executed, where the program instructions, when being loaded and executed by the processor, causes any operation in the above vibration signal testing method to be executed. The reference of specific description may be made to the embodiments of the above vibration signal testing method.

FIG. 3 is a schematic view of an electronic device provided according to an embodiment of the present disclosure. As shown in FIG. 3, the electronic device 30 in this embodiment includes a processor 31, a memory 32, and a computer program 33 stored in the memory 32 that can be executed on the processor 31. The computer program 33 is executed by the processor 31 to implement the vibration signal testing method in the above embodiments, which will not be repeated here to avoid repetition. Alternatively, in response to the computer program being executed by processor 31, functions applied to various models/units in the vibration signal testing device in the embodiments are implemented, which will not be repeated here to avoid repetition.

The electronic device 30 includes, but is not limited to, the processor 31 and the memory 32. Those of ordinary skills in the art can understand that FIG. 3 is only an example of the electronic device 30 and does not constitute a limitation on the electronic device 30. The electronic device 30 may include more or fewer components than shown in the FIG. 3, or combinations of certain components, or different components. For example, the electronic device 30 further includes an input and output device, a network access device, buses, etc.

The processor 31 may be a central processing unit (CPU), a general-purpose processor, a digital signal processor (DSP), an application specific integrated circuit (ASIC), a field programmable gate array (FPGA), or other programmable logic devices, a discrete gate, or a transistor logic device, a discrete hardware component, etc. The general-purpose processor may be embodied as a microprocessor or any conventional processor.

The memory 32 may be an internal storage unit of the electronic device 30, such as a hard disk or an inter storage of the electronic device 30. The memory 32 may also be an external storage device of the electronic device 30, such as a plug-in hard disk, a smart media card (SMC), a secure digital (SD) card, a flash card, etc. provided on the electronic device 30. Furthermore, the memory 32 may include both internal storage units and external storage devices of the of electronic device 30. The memory 32 is configured to store computer programs and other programs and data required by the network device. The memory 32 may also be used to temporarily store data that has been or will be output.

Those of ordinary skills in the art can clearly understand that for the convenience and conciseness of the description, the specific working processes of the system, device, and unit described above can refer to the corresponding processes in the above method embodiments, which will not be repeated here.

In the several embodiments provided according to the present disclosure, it should be understood that the disclosed system, device, and method can be implemented in other ways. For example, the device embodiments described above are only schematic. For example, the division of the units is only a logical functional division, and there may be other division methods in actual implementation. For example, multiple units or components may be combined or integrated into another system, or some features can be ignored or not executed. In addition, the coupling or direct coupling or communication connection displayed or discussed between each other can be indirect coupling or communication connection through some interfaces, devices or units, which can be electrical, mechanical or other forms.

The units described as separate components may be or may not be physically separated, and the components displayed as units may be or may not be physical units, that is, the units can be in one place or distributed across multiple network units. Some or all the units can be selected according to actual needs to achieve the purpose of the embodiments.

In addition, each functional unit in each embodiment of the present disclosure can be integrated in a processing unit, or each unit can exist physically independently, or two or more units can be integrated in a unit. The integrated units mentioned above can be implemented in both hardware and software functional units.

The integrated unit implemented in the form of software functional units mentioned above can be stored in a computer readable storage medium. The above software functional units are stored in a storage medium, including several instructions to enable a computer device (i.e., a personal computer, a server, or a network device, etc.) or a processor to execute some operations of the method described in various embodiments of the present disclosure. The above storage medium includes a USB flash drive, a mobile hard drive, a read only memory (ROM), a random-access memory (RAM), a magnetic disk or an optical disc, and other media that can store program codes.

The above are only preferred embodiments of the present disclosure and are not intended to limit the present disclosure. Any modifications, equivalent substitutions, improvements made within the spirit and principles of the present disclosure should fall within the scope of protection of the present disclosure.

The invention claimed is:

1. A vibration signal testing method, comprising:
   collecting an editing operation of a user;
   obtaining a first vibration signal according to the editing operation;
   outputting the first vibration signal to a mobile terminal, wherein the first vibration signal is used to instruct the mobile terminal to execute a first vibration;
   determining a corresponding test result according to actual vibration effect of the first vibration, wherein
   the editing operation comprises at least one or a combination of following operations:
   editing trigger time of at least one set of preset basic vibration signals, editing trigger frequency of the at least one set of preset basic vibration signals, and editing signal superposition of the at least one set of preset basic vibration signals.

2. The method according to claim 1, further comprising:
   adjusting the first vibration signal after preset triggering conditions are detected by the mobile terminal, and adjusting vibration effect of the first vibration, wherein adjusting the vibration effect of the first vibration comprises: adjusting vibration frequency and/or vibration intensity.

3. The method according to claim 2, further comprising:
   obtaining an adjusted first vibration signal from the mobile terminal, wherein the adjusted first vibration signal comprises at least one or a combination of a trigger time point, a vibration type, the vibration frequency, and the vibration intensity;
   saving the adjusted first vibration signal accordingly.

4. The method according to claim 3, wherein the mobile terminal is provided with a control component and a vibration component, the vibration component is configured to execute vibration for the mobile terminal, and the control component is configured to control operating status of the vibration component by sending control instructions to the vibration component;
   wherein obtaining the adjusted first vibration signal from the mobile terminal comprises:
   collecting control instructions sent by the control component;
   determining the adjusted first vibration signal according to the control instructions.

5. The method according to claim 4, wherein the vibration component is a vibration motor, and the adjusted first vibration signal further comprises a resonant frequency of the vibration motor.

6. The method according to claim 1, further comprising:
   in response to the mobile terminal performing mixed vibration, obtaining at least two corresponding preset vibration signals from the mobile terminal, wherein the mobile terminal is provided with a plurality of preset buttons, and each of the plurality of preset buttons corresponds to a preset vibration signal; in response to at least two preset buttons being triggered, performing, by the mobile terminal, the mixed vibration;
   saving the at least two preset vibration signals as mixed vibration signals or separately saving the at least two preset vibration signals as independent vibration signals.

7. An electronic device, comprising a memory and a processor, wherein the memory is configured to store information comprising program instructions, and the processor is configured to control the program instructions to be executed, wherein the program instructions, when being loaded and executed by the processor, causes the method according to claim 1 to be executed.

8. The electronic device according to claim 7, wherein the program instructions, when being loaded and executed by the processor, causes the method according to claim 3 to be executed.

9. The electronic device according to claim 7, wherein the program instructions, when being loaded and executed by the processor, causes the method according to claim 4 to be executed.

10. The electronic device according to claim 7, wherein the program instructions, when being loaded and executed by the processor, causes the method according to claim 5 to be executed.

11. The electronic device according to claim 7, wherein the program instructions, when being loaded and executed by the processor, causes the method according to claim 6 to be executed.

12. The electronic device according to claim 7, wherein the program instructions, when being loaded and executed by the processor, causes the method according to claim 7 to be executed.

* * * * *